July 14, 1970  M. J. H. FOWLER  3,520,565
CONNECTING OF TAPERED SPIGOTS AND SOCKETS
Filed Oct. 25, 1967

United States Patent Office 3,520,565
Patented July 14, 1970

3,520,565
CONNECTING OF TAPERED SPIGOTS AND SOCKETS
Michael John Henry Fowler, Ndola, Zambia, assignor to Padley & Venables Limited, Dronfield, near Sheffield, Yorkshire, England, a British company
Filed Oct. 25, 1967, Ser. No. 678,088
Claims priority, application Great Britain, Oct. 28, 1966, 48,360/66
Int. Cl. F16b 2/00
U.S. Cl. 287—126        6 Claims

ABSTRACT OF THE DISCLOSURE

A tapered spigot or socket member which carries on its tapered portion ductile material secured thereto by an adhesive, by an interference fit or by location in a complementary recess in the member and the material being disposed symmetrically around the perimeter of the tapered portion; the ductile material standing proud of the tapered surface by a thickness of between 1.5% and 4.5% of the largest dimension in cross-section of the spigot or socket at the mid position of the taper and the exposed area of the ductile material not exceeding 50% of the area of the tapered portion.

---

This invention concerns metal tapered spigot and socket connections of the kind which are used for end to end connection of two elements in axial alignment.

As one example, among many, such connections are used to assemble drill bits having tapered spigot members or shanks into socket members co-extensive with a drilling machine arbor or a lathe headstock. In some instances, as in the case with drills for piercing masonry percussive forces may be superimposed on rotation torque.

It is a common experience that, when the angle of taper is large enough to permit separation of spigot from socket upon the application of reasonable force, a sudden cessation of the pressure tending to force the two members together in use, may allow the two parts to loosen and even separate from each other completely. Such behavior can cause difficulties as for example, the case where on drilling through a cavity wall, a taper-shanked drill becomes detached and falls, irrecoverably, into the wall cavity.

One proposal to overcome this difficulty has been to provide between the spigot and socket, a "thimble" in the form of a tapered sleeve of brass or other ductile metal, the taper being the same as that of the parts to be fitted together; this thimble having a very thin wall section in the order of 0.02 inch or less.

Upon assembly and under percussive load, the metal of this thimble was intended to spread and extrude so as to fill closely the space between the spigot and socket including surface irregularities on the two tapered parts. This expedient was not always satisfactory and, in cases involving a percussive drill bit having side flushing holes for water, the extruded metal sometimes tended to obscure the hole.

It is the purpose of this invention to provide an improved means for holding a tapered spigot member firmly in a complementary socket member securely enough to prevent unwanted separation in use while, at the same time, not preventing separation when this is necessary.

According to the present invention there is provided a member for use as one part of a tapered spigot and socket connection, the member carrying ductile material secured thereto and disposed substantially symmetrically around the perimeter of its tapered portion and standing above the tapered surface of the member, the exposed area of the ductile material not exceeding 50% of the area of the tapered portion the projection of the uppermost surface of the ductile material above the surface of the tapered portion being between 1.5% and 4.5% of the largest dimension in cross section at the mid-position of the taper, the arrangement being such that upon the member being assembled tightly together with the other complementary tapered part of the connection, the ductile material will be deformed and caused to flow into the surrounding region between the spigot and socket and will then be wiped over the two tapered surfaces as they come together, so as to provide an area of very close contact.

By the expression "the largest dimension of cross-section at the mid position of the taper" as used throughout this specification, I mean:

(i) In the case of a spigot and socket of circular cross-section the diameter of the spigot at its mid position (ii) In the case of a spigot and socket of polygonal cross-section the diameter of a circle circumscribing the spigot at its mid position (iii) In the case of a spigot and socket of elliptical cross section the dimension of the major axis of the ellipse.

In use, the present invention provides a tight fit between the spigot and socket which fit is maintained by the enhanced frictional effect due to the presence of the ductile material between the two mating and tapered surfaces. The invention can be applied to provide an accurate tight fit (i.e. with the spigot and socket in true axial alignment) as may be required for use in a machine tool, such as a lathe headstock, by suitable arrangement and deposition of the ductile material.

Conveniently the projection of the ductile material above the surface of the member does not exceed 0.04 inch.

If desired, a plurality of discrete inserts of ductile material may be provided, separated from each other in any circumferential plane.

In one simple form, the ductile material may comprise a ring or rings of uniform cross section which are conveniently housed in a circumferential groove in the member. Such rings may be open-jointed and conveniently may be of circular or rectangular cross section, formed by bending wire or strip around the groove, with a butt joint.

In an alternative form, the ductile material comprises strips or rods disposed symmetrically around the member and running substantially parallel to its axis or slightly spirally. Conveniently the strips or rods of the ductile material may be housed in complementary grooves or recesses provided in the member.

In a further alternative form the ductile material is of a filigree or lace like construction or openwork, the area of which is more than 20% and less than 50% of the total area of the tapered surface of the member. Conveniently the openwork is housed in a complementary recess provided in the member.

The ductile material may be copper or an alloy thereof; zinc or an alloy thereof; aluminum or an alloy thereof or a plastics material, such, for example, as nylon.

The ductile material may be secured to the member by a suitable adhesive such as varnish or the like.

It should be appreciated that the ductile material may be provided on the spigot member or on the socket member or on both.

Various embodiments of the invention will now be described by way of example and with reference to the accompanying diagrammatic drawings, in which.

Figure 1:
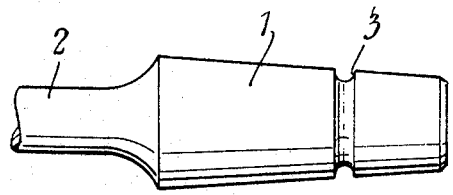
FIG. 1 shows, in side elevation, a tapered spigot member of circular cross section having a circumferential groove intended to carry an annular insert of ductile material.
Figure 2:
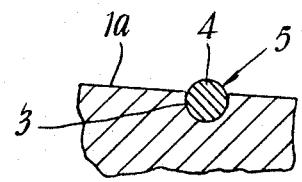
FIG. 2 shows an enlarged part-sectional view of the groove of FIG. 1, with the ductile material in position.

Referring to FIGS. 1 and 2, the member of FIG. 1 comprises a tapered spigot 1 formed on the end of a length of drill steel 2, the taper being a standard taper such as is conventionally used. Part way along the taper, there is provided an annular groove 3 which, in this example, is of substantially semi-circular cross section. As shown in FIG. 2, the groove is intended to carry an insert 4 of ductile material, conveniently in the form of a ring of soft copper. It will be observed from FIG. 2 that the centre point 5 of the ring 4 is located somewhat below the surface 1a of the taper. The dimensions of the ring 4 and the groove 3 are so selected and arranged that the projection of the uppermost surface of the ring 4 above the surface of the tapered portion is approximately 3% of the diameter of the spigot 1 at its mid-position. The insert may be made as an open ring by bending a length of copper wire around the annular groove so that the ends abut.

Upon the spigot being driven home into a socket which has a complementary taper, the ring 5 will be compressed, and will deform into and fill the annular groove 3. Because the ring 4 stands slightly above the tapered surface of the spigot and because its volume is slightly greater than the volume defined by the groove 3, surplus metal will be extruded and will spread over the adjacent surfaces between the spigot and its mating socket, so that the soft copper fills any minute depressions or irregularities such as machining marks, both in the surface of the spigot and the co-acting surface of the socket.

The insert 4 is conveniently circular in cross section (as illustrated in FIG. 2) so that it mates with the annular groove 3. However, it will be realised that the ring need only be part circular in cross section, that is the part which mates with the groove 3. The remaining non-circular part of the ring which stands proud of the tapered surface can be of any shape and preferably this non-circular part is flat and parallel with the tapered surface as this provides efficient availability of the ductile material whilst permitting ease of insertion of the spigot into this socket.

Figure 3:
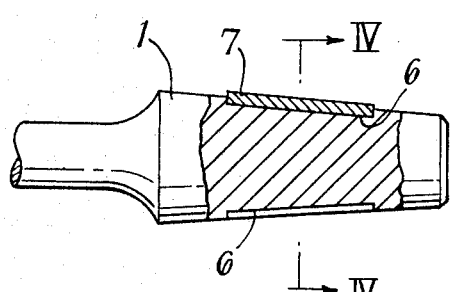
FIG. 3 shows a section, on the lines III—III of FIG. 4, of a tapered spigot member of circular cross section having axial grooves and carrying inserts in the form of strips of ductile material.
Figure 4:
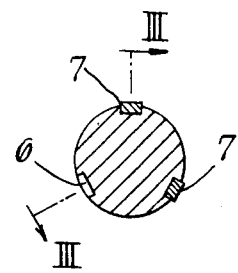
FIG. 4 shows a section, on the line IV—IV of FIG. 3, of the construction of FIG. 3.

In the examples shown in FIGS. 3 and 4, the spigot 1 has rectangular slots 6 milled in it at three equidistant places around its circumference, the slots running parallel to the axis of the spigot. One of the slots 6 in FIG. 3 is shown without any insert, while the upper slot and the remaining slot shown in FIG. 4, carry an insert 7, in the form of a rectangular section strip of copper or other ductile material which, as in the previous embodiment, protrudes slightly above the surface of the spigot for example about 0.04 inch. Alternatively the circumferentially spaced slots can be of semi-circular or "rounded bottom" shape (not shown) in radial cross-section to receive a complementary shaped strip of copper or other ductile material in the aforementioned manner. When this spigot is driven home into a complementary tapered socket, the ductile material of the inserts will, as in the previous example, deform and extrude to produce an extremely close fit between the two parts.

Figure 5:
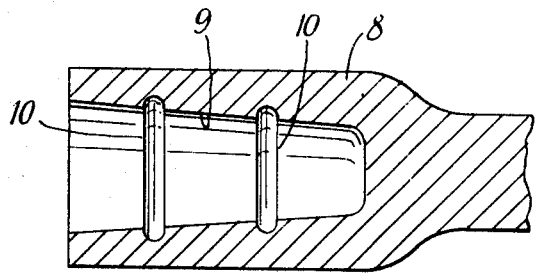
FIG. 5 shows a longitudinal sectional view of a tapered socket member of circular cross section having two circumferential grooves intended to carry inserts or ductile material.

In the example of FIG. 5, a socket member 8 is shown having a tapered bore illustrated generally as 9, in which are milled two annular grooves 10. These annular grooves may be rectangular to carry rectangular strips of ductile material or, as illustrated, may be substantially semi-circular in cross section and similar to the groove of FIG. 2, in which case they will carry round section inserts made from wire or similar material.

Figure 6:
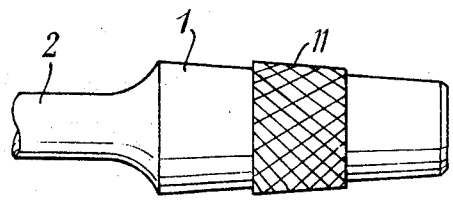
FIG. 6 shows in side elevation, a tapered spigot member of circular cross section having secured thereto ductile material in the form of a filigree sleeve.

In the example of FIG. 6 the tapered surface of the spigot 1 carries an openwork sleeve 11 of ductile material which is secured thereto by a suitable adhesive, for example shillac. The area of the sleeve 11 is approximately 30% of the total area of the tapered surface of the member and the sleeve is conveniently formed of openly knitted copper wire.

It will be apparent that where an adhesive is utilised to secure the ductile material to the member, the use of a strong adhesive is not essential since its purpose is merely to retain the ductile material at a positive location during the insertion of the spigot into the socket.

In some instances, the ductile material may be provided both on the spigot and in the socket, but this is not normally necessary.

Conveniently, ductile material will be chosen which has a relatively high coefficient of friction in relation to the material of the drill rod so that, after assembly, the region of close contact over which the ductile material has spread, will also be a region where there is a relatively high coefficient of friction between the members of the joint.

I claim:

1. A member for use as one part of a tapered spigot and socket conection, said member having a tapered surface for engagement with the corresponding part of said connection, ductile material secured to a maximum of 50% of the area of the tapered surface of said member, said ductile material being composed of a plurality of separate portions spaced from each other and arranged symmetrically about said tapered surface and extending outwardly from said tapered surface between about 1.5% and 4.5% of the largest cross-sectional dimension at the midpoint of the longitudinal axis of the tapered surface of said member.

2. A member as claimed in claim 1, wherein the separate portions of said ductile material are in the form of strips extending substantially longitudinally along the tapered surface of said member and spaced symmetrically apart about the perimeter thereof.

3. A member for use as one part of a tapered spigot and socket connection, said member having a tapered surface for engagement with the corresponding part of said connection, ductile material secured to a maximum of 50% of the area of the tapered surface of said member, said ductile material being in the form of at least one ring of uniform cross section secured to said member to extend substantially around the periphery of said tapered surface, and extending outwardly from said tapered surface between about 1.5% and 4.5% of the largest cross-sectional dimension at the midpoint of the longitudinal axis of the tapered surface of said member.

4. A member for use as one part of a tapered spigot and socket connection, said member having a tapered surface for engagement with the corresponding part of said connection, ductile material secured to the tapered surface of said member, said ductile material being in the form of an openwork formed from wires of said ductile material and occupying from 20% to 50% of the tapered surface of said member, and extending outwardly from said tapered surface between about 1.5% and 4.5% of the largest cross-sectional dimension at the midpoint of the longitudinal axis of the tapered surface of said member.

5. A member as claimed in claim 4, wherein the tapered surface of said member is provided with a recess complementary to said openwork, said ductile material being disposed within said recess.

6. A member as claimed in claim 4, wherein said member comprises the spigot portion of said connection.

References Cited

UNITED STATES PATENTS

| | | | |
|---|---|---|---|
| 1,519,101 | 12/1924 | Armstrong. | |
| 1,801,171 | 4/1931 | Mueller et al. | 287—119 XR |
| 1,941,289 | 12/1933 | Bedford | 287—119 |
| 1,958,621 | 5/1934 | Heppenstall | 287—126 XR |
| 2,042,088 | 5/1936 | Bedford | 175—409 |
| 2,331,474 | 10/1943 | Janoska | 287—119 |
| 3,318,401 | 5/1967 | Carbert | 287—119 XR |

DAVID J. WILLIAMOWSKY, Primary Examiner

A. V. KUNDRAT, Assistant Examiner